US007552669B1

(12) United States Patent
Denis et al.

(10) Patent No.: US 7,552,669 B1
(45) Date of Patent: Jun. 30, 2009

(54) COORDINATED BALLISTIC MISSILE DEFENSE PLANNING USING GENETIC ALGORITHM

(75) Inventors: Nikolaos A. Denis, Moorestown, NJ (US); David R. Gavelek, Bedford, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 567 days.

(21) Appl. No.: 11/356,675

(22) Filed: Feb. 16, 2006

Related U.S. Application Data

(60) Provisional application No. 60/749,746, filed on Dec. 13, 2005.

(51) Int. Cl.
*B64D 1/04* (2006.01)
(52) U.S. Cl. .................... 89/1.11; 244/3.1; 244/3.11; 705/7; 705/8; 703/2
(58) Field of Classification Search .................... None
See application file for complete search history.

(56) References Cited

U.S. PATENT DOCUMENTS 5,611,502 A * 3/1997 Edlin et al. ............... 244/3.16
6,186,397 B1 * 2/2001 Brouwer .................. 235/411
6,825,792 B1 * 11/2004 Letovsky .................. 342/14
6,877,691 B2 * 4/2005 DeFlumere et al. ........ 244/3.16
7,210,392 B2 * 5/2007 Greene et al. ............. 89/41.03
7,394,047 B1 * 7/2008 Pedersen .................. 244/3.1
2004/0004155 A1 * 1/2004 DeFlumere et al. ........ 244/3.11
2007/0169616 A1 * 7/2007 Vickroy .................... 89/1.11
2008/0093498 A1 * 4/2008 Leal et al. ................. 244/3.2

* cited by examiner

*Primary Examiner*—James S Bergin
*Assistant Examiner*—Samir Abdosh
(74) *Attorney, Agent, or Firm*—Duane Morris LLP

(57) ABSTRACT

A method for generating plans against ballistic missiles begins with the locations of regions from which missiles may be launched and identifies regions to be defended. The available sensor and engagement assets, their capabilities and possible locations are identified. At least some of the assets have sensor and engagement capabilities independent those of other assets. Initial potential plans are binary encoded, and applied to a genetic algorithm for producing a population of genetically modified solutions. These modified solutions are decoded and evaluated for fitness. The fitness evaluations are iteratively reapplied to the genetic algorithm to ultimately produce improved plans. The improved plans are decoded and finally evaluated for fitness and application. This process continues for a fixed number of iterations, at the end of which the best solution is presented as the plan best fit to achieve a valid defense against the BMD threats.

10 Claims, 15 Drawing Sheets

| | DESCRIPTION |
|---|---|
| $P_{kill}(i; \pi_D)$ | PROBABILITY THAT THE $i^{th}$ MISSILE IS NEGATED, GIVEN THE DEFENSE PLAN $\pi_D$ |
| $P_{single\text{-}shot\ kill}(i,j; \pi_D)$ | PROBABILITY THAT THE $i^{th}$ MISSILE IS NEGATED BY THE $j^{th}$ INTERCEPTOR, GIVEN THE DEFENSE PLAN $\pi_D$ |
| $P_{single\text{-}shot\ kill/shot}(i,j; \pi_D)$ | CONDITIONAL PROBABILITY THAT THE $i^{th}$ MISSILE IS NEGATED BY THE $j^{th}$ INTERCEPTOR, GIVEN THAT THE INTERCEPTOR IS SHOT UNDER PLAN $\pi_D$ |
| $P_{shot/track}(i,j; \pi_D)$ | CONDITIONAL PROBABILITY THAT THE $j^{th}$ INTERCEPTOR IS LAUNCHED AT THE $i^{th}$ MISSILE, GIVEN THAT THE MISSILE IS TRACKED UNDER PLAN $\pi_D$ |
| $P_{track/acquire}(i; \pi_D)$ | CONDITIONAL PROBABILITY THAT THE $i^{th}$ MISSILE IS TRACKED, GIVEN THAT THE MISSILE IS ACQUIRED UNDER PLAN $\pi_D$ |
| $P_{cued\ acq/acquire}(i; \pi_D)$ | CONDITIONAL PROBABILITY THAT THE $i^{th}$ MISSILE IS ACQUIRED VIA A CUED SEARCH, GIVEN THAT THE MISSILE WAS PREVIOUSLY ACQUIRED UNDER PLAN $\pi_D$ |
| $P_{cued\ acq/receive\ cue}(i; \pi_D)$ | CONDITIONAL PROBABILITY THAT THE $i^{th}$ MISSILE IS ACQUIRED VIA A CUED SEARCH, GIVEN THAT THE SENSOR SUPPORTING THE SHOOTING INTERCEPTOR HAS RECEIVED A CUE UNDER PLAN $\pi_D$ |
| $P_{receive\ cue/cue\ sent}(i; \pi_D)$ | CONDITIONAL PROBABILITY THAT THE SENSOR SUPPORTING THE SHOOTING AT THE $i^{th}$ MISSILE RECEIVES THE CUE, GIVEN THAT THE CUE WAS SENT UNDER PLAN $\pi_D$ |
| $P_{cue\ sent/track}(i; \pi_D)$ | CONDITIONAL PROBABILITY THAT THE CUEING SENSOR TRANSMITS A CUE FOR THE $i^{th}$ MISSILE, GIVEN THAT THE SENSOR HAS TRACKED THE MISSILE UNDER PLAN $\pi_D$ |
| $P_{track/acquire}(i; \pi_D)$ | CONDITIONAL PROBABILITY THAT A SENSOR TRACKS THE $i^{th}$ MISSILE, GIVEN THAT THE SENSOR HAS ACQUIRED THE MISSILE UNDER PLAN $\pi_D$ |
| $P_{acquire}(i; \pi_D)$ | PROBABILITY THAT A SENSOR ACQUIRES THE $i^{th}$ MISSILE, UNDER PLAN $\pi_D$ |

FIG. 5

COORDINATED BALLISTIC MISSILE DEFENSE PLANNING USING GENETIC ALGORITHM

CROSS-REFERENCE TO RELATED APPLICATIONS

This application claims the benefit of the priority date of Provisional Application No. 60/749,746, filed Dec. 13, 2005.

GOVERNMENTAL INTEREST

This invention was made with government support under Contract N00024-03-C-6110. The United States Government has a non-exclusive, non-transferable, paid-up license in this invention.

FIELD OF THE INVENTION

This invention relates to planning of coordinated defense against ballistic missile threats using available assets to tend toward an optimal result.

BACKGROUND OF THE INVENTION

Robust missile defense relies on an array of complementary assets performing diverse surveillance and engagement tasks against ballistic missile attack. The engagement or destruction of a hostile ballistic missile requires that the missile be detected and its trajectory estimated, and possible means for engagement identified. The destruction also requires that from among the identified means for engagement or assets, at least one be selected for use. Once one or more assets are identified for use in engaging the missile, an intercept path must be defined for the interceptor, based on the projected location of the missile at the time of interception.

Several Ballistic Missile Defense (BMD) assets are currently available, including sea-based Aegis, land-based Theater High Altitude Area Defense (THAAD), and Patriot. Each of these assets has its own associated planner which independently generates its mission plan.

FIG. 1 is a simplified representation of the ballistic missile defense (BMD) problem, showing a littoral (shallow-water) region between a land mass and sea region, and also showing a defended area and known locations from which attacking missile can or might be launched. The physical problem can be understood by reference to FIG. 1. In FIG. 1, a sea region 12 lies adjacent a land mass 14 defining a shoreline 16. A defended region is designated 18. The operating region for sea-based defensive platforms lies in sea area 12, and is designated 20. The operating region for land-based defensive assets is designated 22. An adversary is expected to launch ballistic missiles from a set of launch areas whose positions are known, which are designated 24a and 24b. The missiles, when launched, fly along trajectories, designated generally as 25a and 25b, to a set of defended areas, one of which is designated 18. A set of assets is assigned the mission to protect these defended areas. Each asset type (e.g. land based, sea based) is constrained to operate within some pre-specified region. These regions, known as operating areas, satisfy several operational constraints. For land based systems, the sensors and interceptors must be located on suitable terrain, away from enemy territory. Sea based sensors and interceptors are located away from commercial shipping lanes and littoral areas controlled by the adversary.

FIG. 3 illustrates the same region as FIG. 1, and corresponding elements are designated by like alphanumerics. In this case, corresponding to the prior art, a single asset, namely asset 220, has a sensor arrangement which is capable of "deploying" a surveillance volume 240, and is also capable of launching an intercepting missile 250 for destroying the ballistic missile threat. Asset 220 detects the threat by observing surveillance volume 240, tracks the threat along at least a portion of its track 25a, and supports the interceptor 250 launched from a land-based asset 220 It is irrelevant to the issues whether the sensors and interceptors are land or sea based. The requirements associated with this engagement sequence are very stringent and this defense mode may not be possible or effective for all possible attacks.

Improved or alternative missile defense methods are desired.

SUMMARY OF THE INVENTION

A method according to an aspect of the invention is for planning ballistic missile defensive actions. The method comprises the steps of defining potential ballistic missile launch areas and areas to be defended, and defining available assets and allowable locations for the available assets, where at least one of the assets has sensing capabilities independent of those of others of the assets, and at least one of the assets has engagement capabilities independent of those of others of the assets. An initial population of potential defensive solutions is defined from the launch areas, defended areas, assets and allowable locations. The initial population of potential defensive solutions is binary encoded. The binary encoded initial population of potential defensive solutions is applied to a genetic algorithm engine, to thereby generate a population of binary encoded genetically modified potential defensive solutions. The population of binary encoded genetically modified potential defensive solutions is decoded to thereby produce non-binary-coded genetically modified potential defensive solutions. At least some of the non-binary-coded genetically modified potential defensive solutions are re-applied to the genetic algorithm engine to thereby generate a further population of binary encoded genetically modified potential defensive solutions. The further population of binary encoded genetically modified potential defensive solutions is decoded to produce a further population of non-binary-coded genetically modified potential defensive solutions. The non-binary-coded genetically modified potential defensive solutions are evaluated, and one of the non-binary-coded genetically modified potential-defensive solutions is deemed to be the desired plan. In a particular mode of this method, the step of evaluating includes the step of ranking non-binary-coded genetically modified potential defensive solutions, wherein the desired plan is among the highest ranked of the non-binary-coded genetically modified potential defensive solutions.

A method according to another aspect of the invention is for computer-aided generation of a plan for coordinating ballistic missile defense assets against ballistic missile threats. The method comprises the steps of acquiring or generating, as by user input, digital information about allowable asset locations, and desired objectives. The method also includes the step of acquiring or generating digital information about allowable asset sensor and engagement capabilities. In particular, at least one of the assets should have sensor capabilities independent of those of others of the assets, and at least one of the assets should have engagement capabilities independent of those of other assets. The digital information so acquired or generated is binary encoded, to thereby generate a binary encoded representation of plural potential plans. The step of binary encoding comprises the step of generating a binary string representing a plan. The plural potential plans are applied to a genetic, optimization process, generally known in the art, for generating a series (or plurality) of processed (or new) potential plans, still represented in binary encoded form. The genetic optimization process may retain at least some of the processed potential plans, and also make them available for decoding. At least some of the decoded processed potential plans are evaluated, possibly by ranking as to suitability. Some of the ranked potential plans may be retained in memory. The evaluations are made available or "fed back" to the genetic optimization process for further genetic optimization. The genetic optimization, decoding, evaluation and feedback process repeats or iterates until some criterion is reached. In one mode of the method, the criterion is a predetermined number of iterations. Following the completion of iteration, the latest decoded solutions are ranked, possibly together with the previously memorized solutions, to thereby generate ranked potential plans. One of the highest-ranked potential plans is selected as the desired plan. Most often, the desired plan is deemed to be the highest-ranked plan. In a particular mode of this method, the step of generating a binary string representing a plan comprises the steps of assigning a first block of bits to represent the locations of all participating assets, a second block of bits to represent all surveillance tasks, and a third block of bits to represent all engagement tasks. In this particular mode, the step of assigning a second block of bits to represent all surveillance tasks includes the steps of assigning a first sub-block of bits of the second block of bits to represent the identity of assigned sensor, a second sub-block of the second block of bits to represent the trajectory which is to be sensed, a third sub-block of bits of the second block of bits to represent the elevation at which sensing is to be performed, and a fourth sub-block of bits of the second block of bits to represent the energy allocated to the sensing task. In this particular mode, the step of assigning a third block of assets to represent all engagement tasks includes the steps of assigning a first sub-block of bits of the third block of bits to represent the identity of assigned asset, and assigning a second sub-block of the third block of bits to represent the trajectory which is to be engaged.

BRIEF DESCRIPTION OF THE DRAWING

FIG. 5 tabulates definitions of terms used in computation of the probability of a kill;

DESCRIPTION OF THE INVENTION

Figure 2:
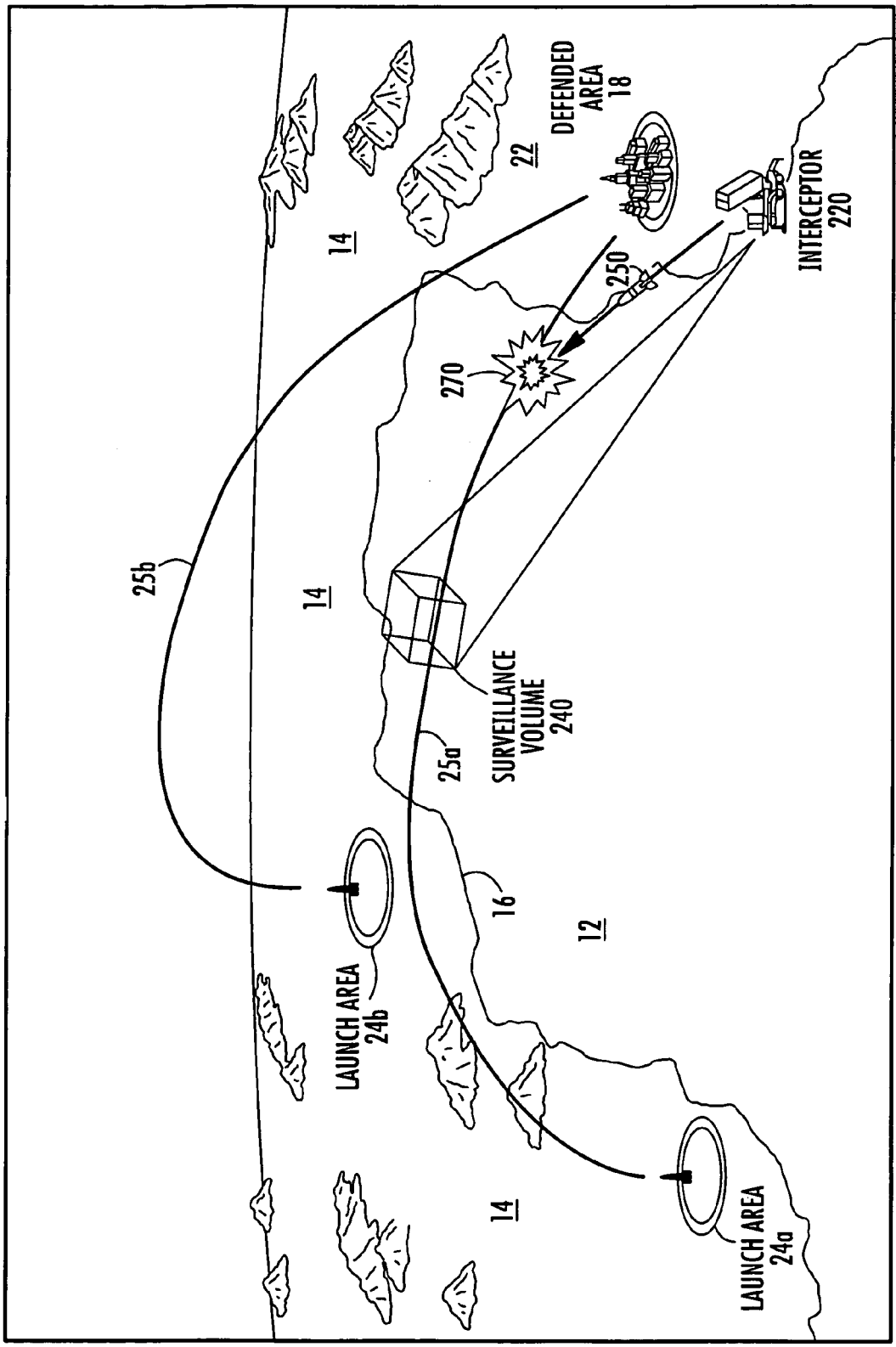
FIG. 2 is a simplified representation of the problem of FIG. 1, showing a prior-art solution in the form of a defense asset carrying sensors for surveilling a volume of space and also carrying interceptor missiles for engaging an attacking ballistic missile threat.

According to an aspect of the invention, the robust missile defense is cast as a multi-variable optimization problem which is solved using a genetic algorithm (GA). The approach of use of a genetic algorithm in missile defense planning is disclosed in D. Pepyne, D. Looze, D. Logan, N. R. Sandell Jr, R. LeBlanc, "A Decision Aid For Theater Missile Defense", Evolutionary Computation, 1997, IEEE International Conference on 13-16 Apr. 1997 Page(s):563-568. As disclosed in Pepyne et al., three assumptions are made that oversimplify the problem and lead to sub-optimal solutions. A first assumption is that each ballistic defense asset includes within itself both sensing and intercept capabilities. The second simplifying assumption in Pepyne et al. is that each sensor "deploys" a single surveillance volume controlled by its field of view and orientation, as illustrated in FIG. 2. The third simplifying assumption in Pepyne et al is that defense assets act independently to detect, engage, and negate a threatening missile (that is, defense assets do not coordinate to perform a task). Put another way, the defense assets are each assumed to be independently capable of negating the threat. These assumptions oversimplify the problem and in general lead to ballistic missile defense plans that may not be effective.

The planning approach or method according to an aspect of the invention alleviates the problems associated with these simplifying assumptions and allows the surveillance assets to simultaneously support multiple surveillance volumes with independently specified size and search intensity. The defense plan according to an aspect of the invention defines the number of surveillance volumes, their size and location, and their energy allocation. These surveillance parameters are chosen to best satisfy the defense objective. Because each asset has limited resources, determining the best energy allocation among the surveillance volumes is a difficult constrained, resource allocation problem. If in Pepyne et al no asset can solely negate a threat, then defense against that threat is not possible. In an aspect of the invention, multiple assets are allowed to coordinate to negate a single missile. This capability may enable a valid defense plan which is inaccessible in Pepyne et al. Additionally, in the case that a single asset can solely negate a threat, solutions that involve the coordination of multiple assets (which may possess only sensing or intercept capabilities) may achieve better performance than solutions without coordinated asset tasking. The missile interception process is decomposed into a series of tasks, each of which can be performed by any available asset, subject to system constraints. The activities of the assets are coordinated as specified by the tasking specified in the defense plan. The planning problem is that of determining a coordinated asset lay-down (assignment of asset locations) and a task/resource allocation. The optimal plan is obtained using a genetic algorithm (GA).

Defense against a missile attack according to an aspect of the invention is planned using multiple, coordinating assets. The coordinating assets may include ground, sea and space based sensors, ground and sea based missile interceptors, and a communication network coupling all of the available assets. The defense uses multiple sensors to perform surveillance and target tracking and multiple interceptors placed to enable destruction of the threatening missiles. The interceptors can be co-located with the sensors, or they can be independently placed. The communication network is used by the participating assets to coordinate the missile engagement.

A successful missile engagement sequence requires the completion of several surveillance and engagement tasks. First, sensors establish surveillance volumes for detecting (with some probability) all missiles flying about an assigned ballistic trajectory. Once a missile is detected, the sensor initiates and maintains an estimate of the missile's current position and velocity, also known as track. The target track is maintained by the sensor for as long as possible. A launched missile's track is broadcast to all participating assets in the form of a cue. The track information contained in a cue can be used to perform one of two possible engagement tasks.

Figure 1:
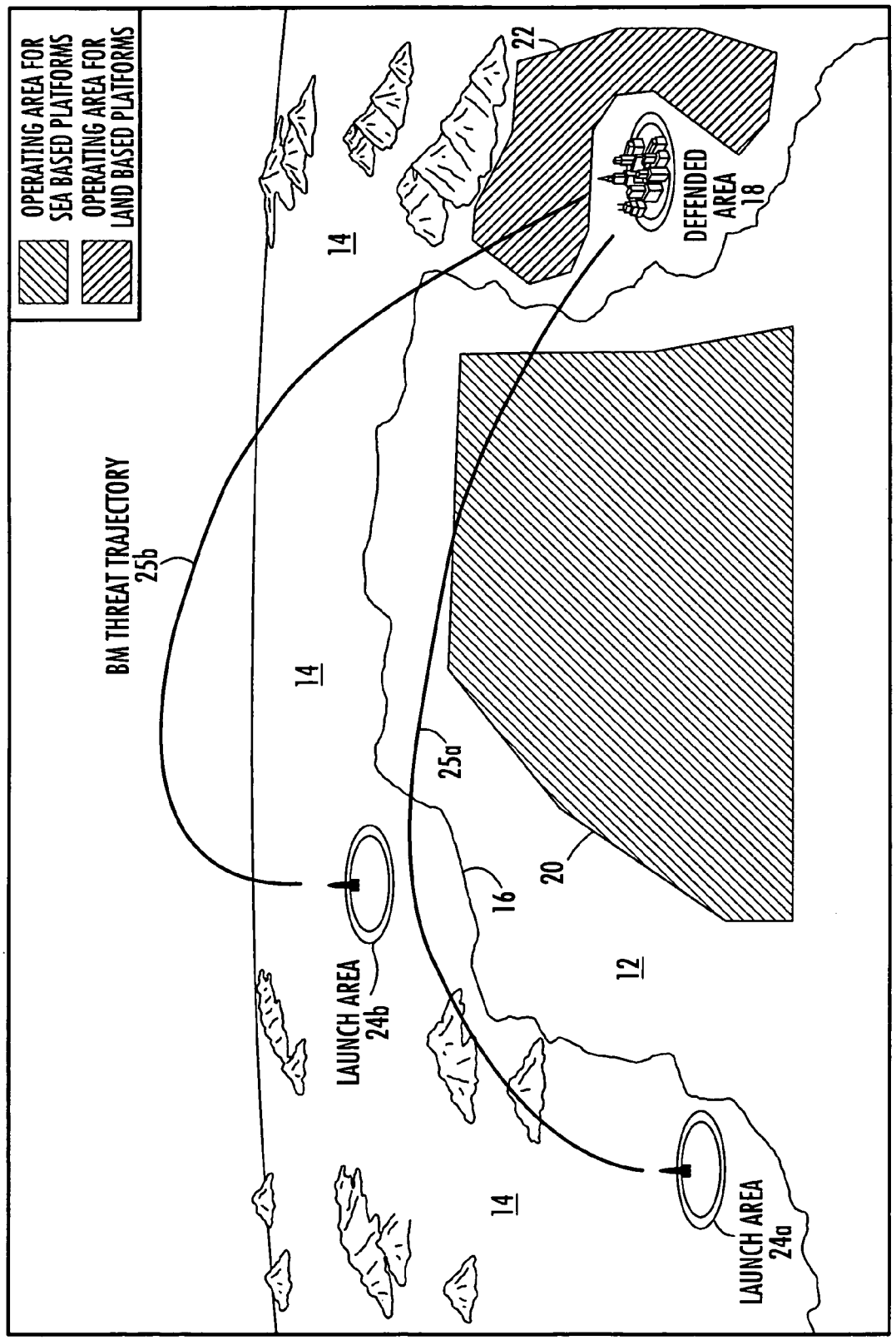
FIG. 1 is a simplified representation of the ballistic missile defense (BMD) problem, showing a littoral (shallow-water) region between a land mass and sea region, and also showing a defended area and known locations from which attacking missile can or might be launched.
Figure 3:
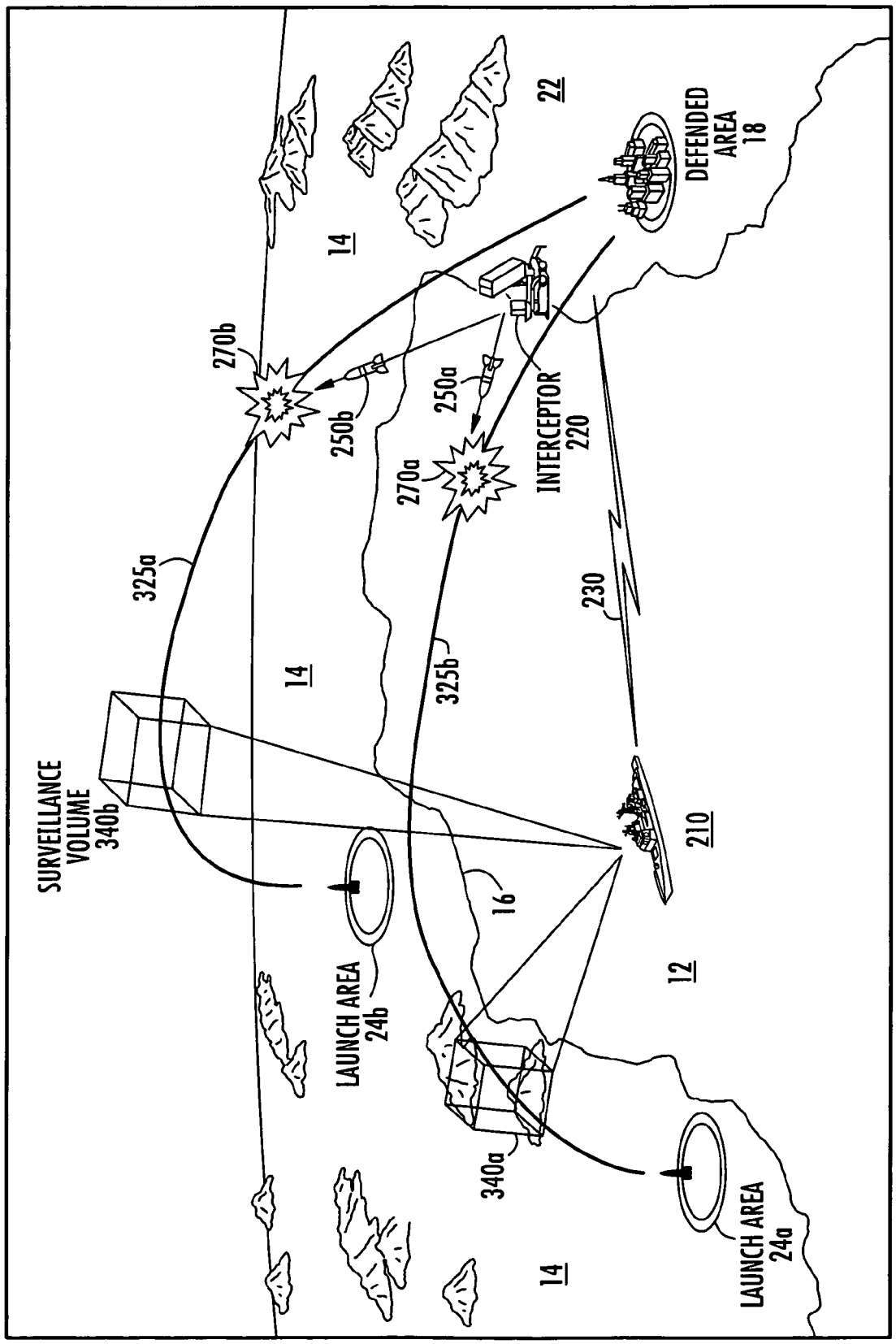
FIG. 3 is a simplified representation of a problem similar to that of FIG. 1, showing one possible general scenario for a plan according to an aspect of the invention.

FIG. 3 illustrates a plan for ballistic missile defense according to an aspect of the invention. In FIG. 3, elements corresponding to those of FIG. 1 are designated by like reference alphanumerics. In FIG. 3, the ballistic missile tracks are designated 325a and 325b. In general, according to an aspect of the invention, a defense asset may have only sensor or intercept capabilities, or if it has both, uses only one of the capabilities. In FIG. 3, a defense asset in the form of a ship 210 at a forward location deploys surveillance volumes 340a and 340b, and senses and tracks the ballistic missiles along their paths. It may be that asset 210 also has intercept capabilities, but does not or cannot use them because of the forward location (that is, by the time they are sensed, it is too late to launch an antiballistic interceptor missile). In accordance with an aspect of the invention, the sensed and track information from asset 210 is provided to the interceptor platform or asset 220 in the form of a cue represented by "lightning bolt" 230. Interceptor 230 receives the cue and, based on the information therein, coordinates to launch an interceptor missile within a time frame adequate to achieve intercept at locations 270a and 270b. It should be noted that interceptor platform 220 may use its own sensors to acquire track of the ballistic missile targets moving along paths 325a and 325b, either simultaneously or sequentially. Thus, the planning according to an aspect of the invention contemplates that multiple defense assets coordinate to intercept a ballistic missile, that each asset may deploy more than one search volume, and that some of the assets may have (or use) only sensor or intercept capabilities.

Depending on how many assets are available, there are four engagement sequence variants that may occur. These four engagement sequences are illustrated in FIGS. 4a, 4b, 4c, and 4d, and capture all possible general ways an enemy missile may be intercepted. In essence, FIGS. 4a through 4d capture the different types of plans which can be generated according to an aspect of the invention. In the first possible engagement task, including an interceptor, a sensor other than one associated with the interceptor can perform an interceptor support task. In this first engagement task, this sensor acquires and initiates a new track on the launched missile, and provides cues to aim and provide guidance to an interceptor. In the second possible engagement task, the cue information generated by the first sensor can be directly used by an interceptor to perform a launch task in an attempt to destroy the incoming threat.

Figure 4A:
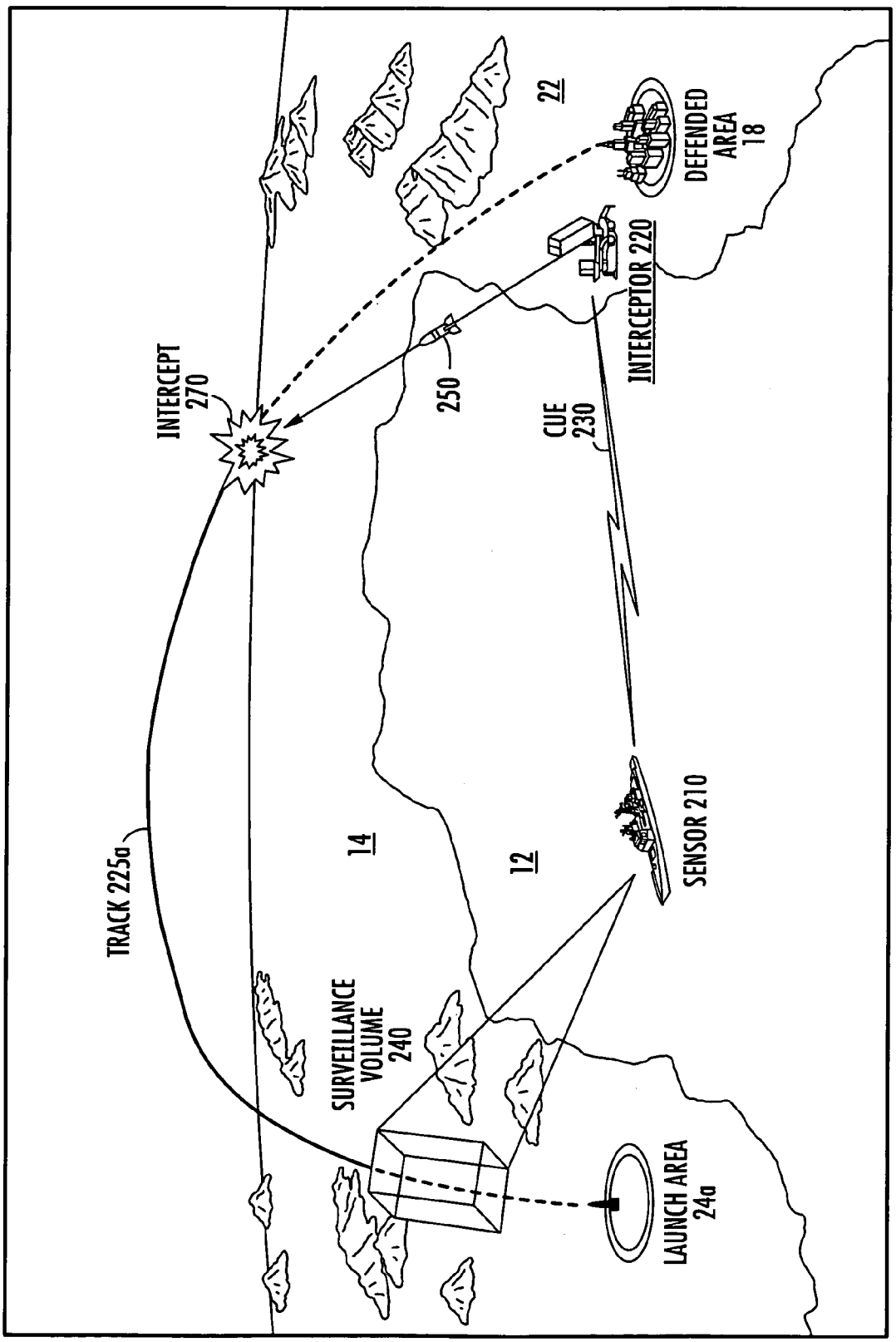
FIG. 4a is a simplified representation of the problem of FIG. 1, showing the use of a single sensor and a single interceptor to defend against a missile attack.

The first engagement sequence is the single-sensor single-shooter sequence illustrated in FIG. 4a. FIG. 4a illustrates the same region as FIG. 1, and corresponding elements are designated by like alphanumerics. In this case, a single seaborne sensor 210 detects the threat by observing a surveillance volume 240, tracks the threat along at least a portion of its track 225a, and supports the interceptor 250 launched from a land-based asset 220 by sending a cue 230. It is irrelevant to the issues where the sensors and interceptors are based.

Figure 4B:
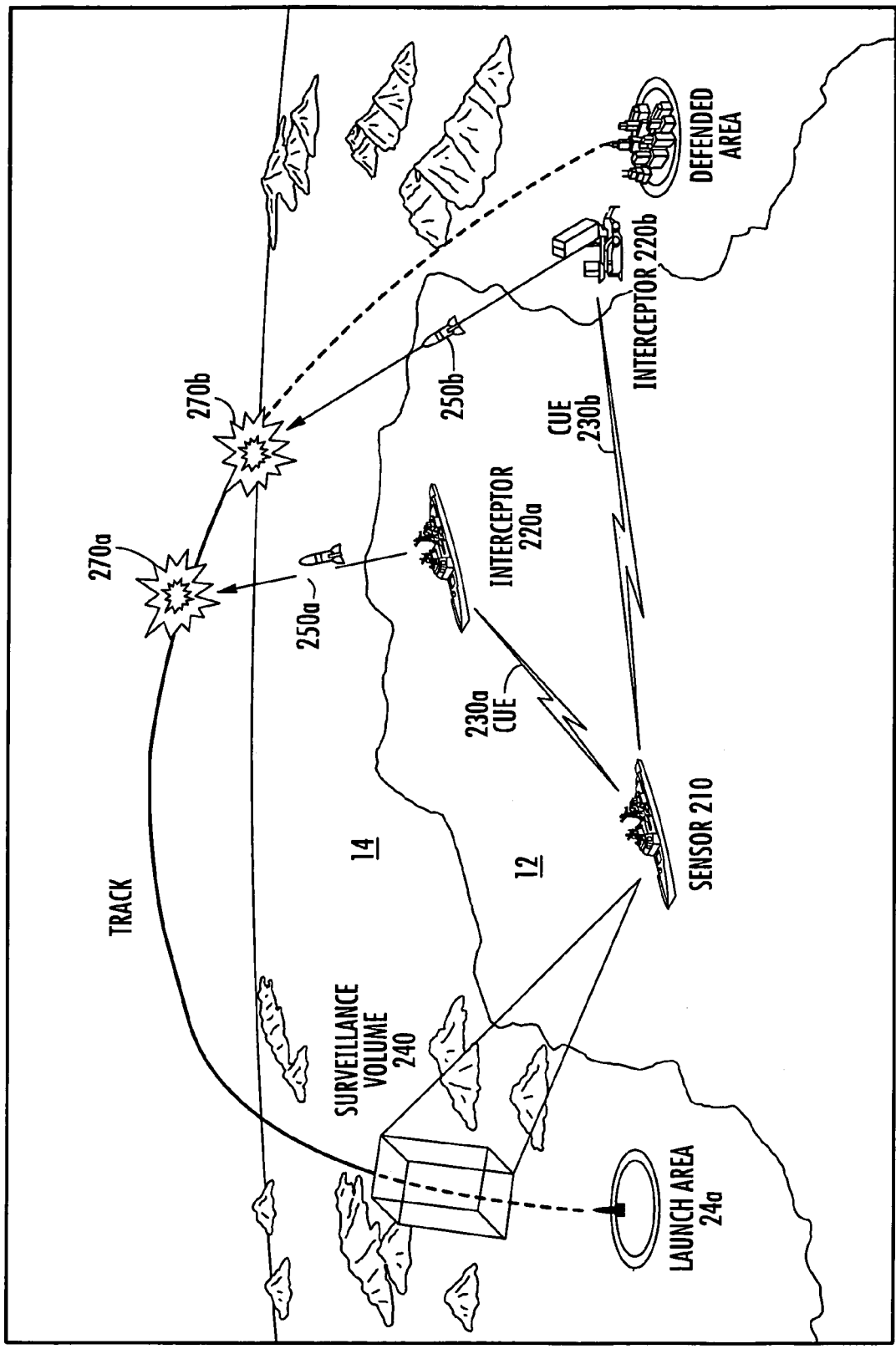
FIG. 4b is a simplified representation of the problem of FIG. 1, showing the use of a single sensor and multiple interceptors to defend against a missile attack.

The second engagement sequence is the single-sensor, multiple-shooter sequence illustrated in FIG. 4b. In the engagement variant of FIG. 4b, a single sensor 210 cues, by way of paths 230a and 230b, multiple interceptor launchers 220a and 220b, respectively, which launch interceptors 250a and 250b, respectively. Naturally, if the first interceptor launch is successful in intercepting the missile, it may not be necessary to launch the second. Since more than one interceptor launch can be achieved, engagement coordination logic is used to determine the preferred shooting strategy. When available, this engagement option provides an enhanced likelihood of successfully negating the missile, as compared to engagements using a single shooter.

Figure 4C:
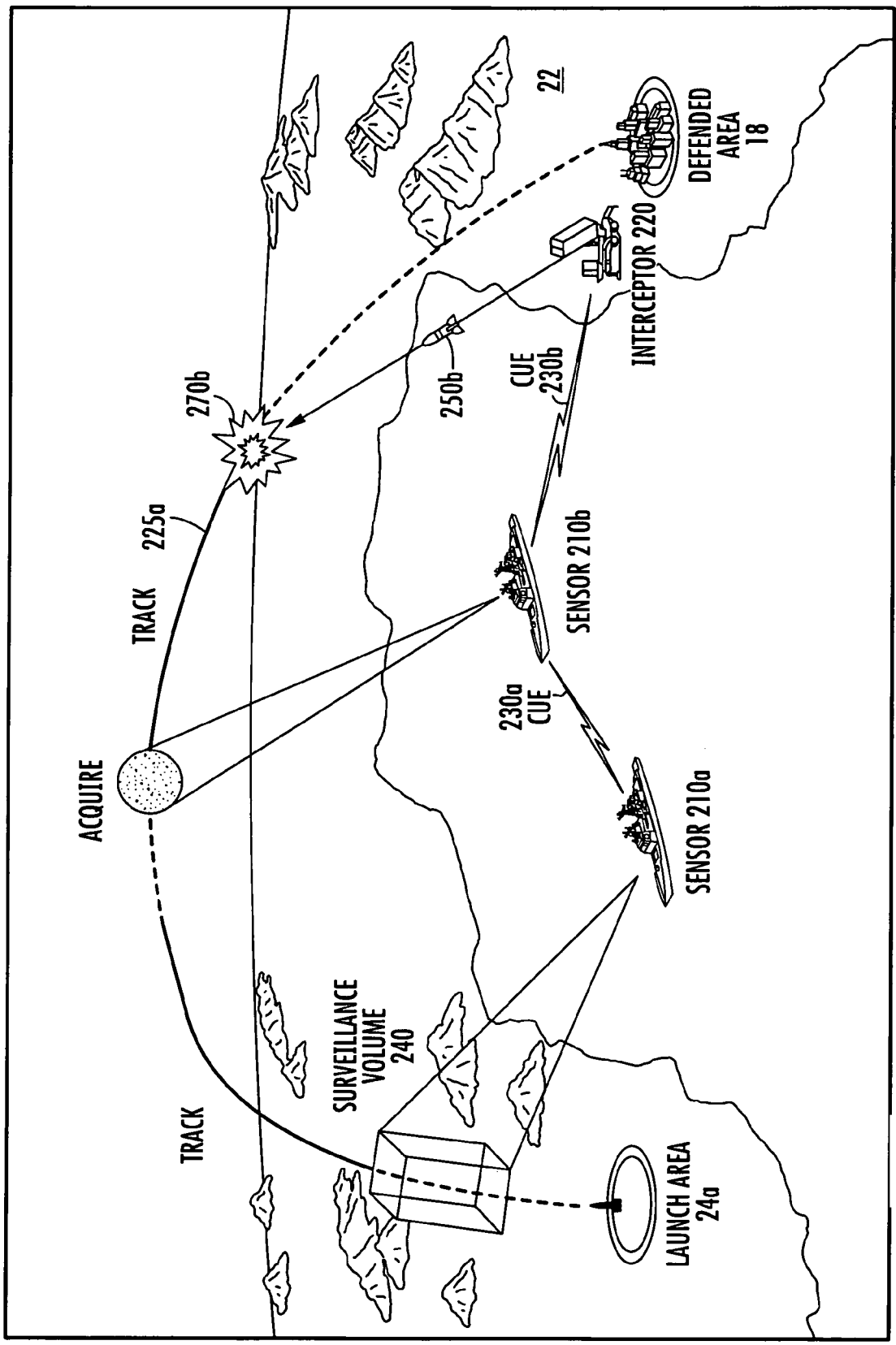
FIG. 4c is a simplified representation of the problem of FIG. 1, showing the use of multiple sensors and a single interceptor to defend against a missile attack.

The third possible engagement sequence is the multiple-sensor single-shooter sequence illustrated in FIG. 4c. In the engagement variant of FIG. 4c, two or more sensors 210a, 210b coordinate to accomplish the surveillance, track, and interceptor support functions. One or more cueing and acquisition exchanges 230a, 230b, 230c, and/or 230d are used to hand-off the missile track 225a from one sensor to the next, until an interceptor 250b launch occurs. This engagement sequence has failure modes not present when a single sensor supports the engagement. For example, there are failure modes associated with the acquisition process and additional failure modes associated with the communication network. However, when a single sensor cannot independently support the engagement, multiple coordinating sensors may. Additionally, multiple coordinating sensors can be used to provide defense robustness, even when a single sensor could support the engagement.

Figure 4D:
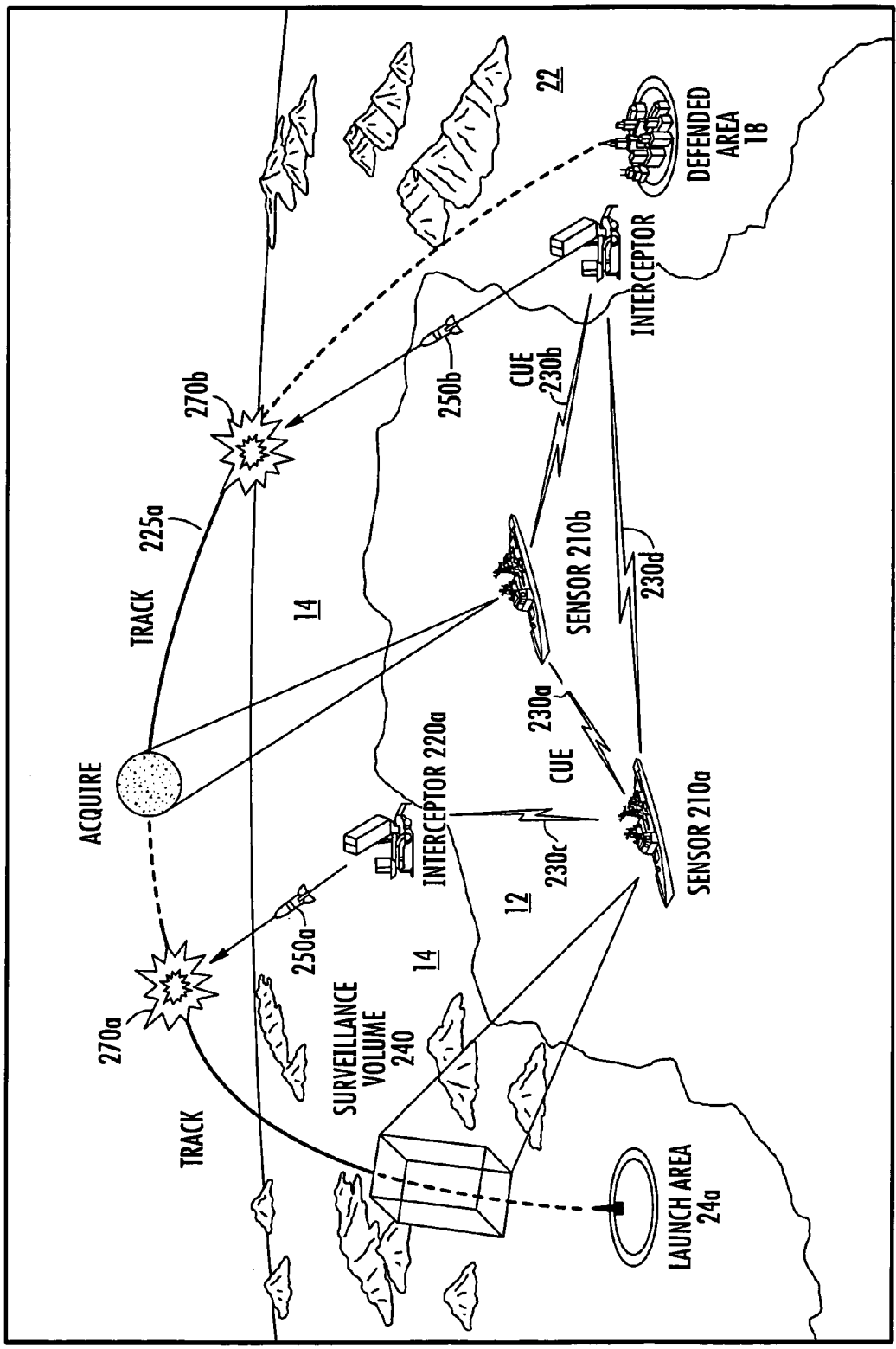
FIG. 4d is a simplified representation of the problem of FIG. 1, showing the use of multiple sensors and multiple interceptors to defend against a missile attack.

The fourth possible engagement sequence is the multiple-sensor multiple-shooter sequence illustrated in FIG. 4d. The engagement variant of FIG. 4d is similar to the multiple-sensor-single-shooter case with the only exception that one or more sensors 210a, 210b provide interceptor support to multiple shooters 220a, 220b. However, track data from multiple sensors is not correlated (fused) and thus an interceptor, such as 250a or 250b, is supported by only one sensor. When available, this engagement option provides an enhanced likelihood of successfully negating the missile, as compared to engagements using multiple sensors and a single shooter.

One of the main difficulties of coordinated asset planning is that the number of potential solutions increases exponentially with the number of coordinating assets. To illustrate this effect, consider a simplified version of the problem of defending against T threats. Assume that p coordinating sensors each have an operational area containing N potential locations. Then there exist $N^p$ possible sensor lay-down or asset placement configurations. Further assume that to negate a threat, two tasks need to be performed; a surveillance task and an engagement task. Thus, when defending against T threats, there are T surveillance tasks and T engagement tasks that need to be performed. If for a given lay-down, each sensor can be assigned any number of surveillance and engagement tasks, and more than one sensor can be assigned the same task, then there are $2^{2T}$ surveillance and engagement task combination options for each sensor. Accounting for all possible sensor taskings and lay-downs, there exist $(2^{2pT}*N^p)$ possible defense plans, where p is the number of coordinating sensors and N is [the number of potential sensor locations. For the relatively small problem of p=3, T=4, and N=1000, there exist $(2^{24}*1000^3) \cong 10^6$ possible plans that need to be considered. Thus, even apparently simple plans have very large numbers of possible solutions.

The problem of formulating or developing a coordinated multi-asset defense plan can be cast as a constrained, static, resource optimization problem. The optimization criterion is to construct a plan that maximizes the defense objective; e.g. maximize surviving defended asset value. Position constraints are imposed by the operating areas defined for each asset type. Resource constraints are imposed by the performance characteristics of each sensor. Finally, the problem is static because the launch areas, defended areas, missile trajectories, and number and type of defense assets, are all substantially fixed during the planning process.

For a given set of threats and available defense assets, a defense plan, $\pi_D$, specifies the lay-down and task allocation for all participating defense assets. When executing a defense plan $\pi_D$, the probability that trajectory i is successfully negated by interceptor j, is referred to as the single-shot probability of kill, $P_{single\text{-}shot\ kill}(i,j;\pi_D)$. If multiple shots are taken at trajectory i, then the probability of kill is given by:

$$P_{kill}(i;\pi_D) = 1 - \prod_j \{1 - P_{single\text{-}shot\ kill}(i,j;\pi_D)\} \quad (1)$$

where the definitions of the various terms can be found in the table of FIG. 5. This probability of a kill assumes, of course, that each shot at the missile provides an independent chance of negating that missile. The single-shot probability of kill is modeled in equation (2) as the product of multiple conditional probabilities:

$$P_{single\text{-}shot\ kill}(i,k;\pi_D) = P_{single\text{-}shot\ kill|shot}(i,j) \cdot P_{shot|track}(i,j) \cdot P_{track|acquire}(i) \cdot P_{acquire}(i) \quad (2),$$

where the defense plan identifier, $\pi_D$, has been suppressed in the arguments on the right hand side (RHS). The probability that the sensor tasked to provide interceptor support succeeds in acquiring the target is modeled by equation (3) as:

$$P_{acquire}(i;\pi_D) = \begin{cases} P_{init\_acquire}(i;\pi_D), & \text{Single Sensor} \\ P_{cued\ acq|acquire}(i;\pi_D) \cdot \\ \quad P_{init\_acquire}(i;\pi_D), & \text{Two coordinating sensors} \\ \prod_{l=1}^{N_{hand-off}} (P_{cued\ acq|acquire}(i,l;\pi_D)) \cdot \\ \quad P_{init\_acquire}(i;\pi_D), & \text{Multiple coordinating sensor} \end{cases} \quad (3)$$

On the RHS of Equation (3), $P_{init\_acquire}(i;\pi_D)$ represents the probability that a first target detection occurs and $P_{cued\ acq|acquire}(i;\pi_D)$ represents the conditional probability of a successful cued acquisition given a previous acquisition by another sensor. This conditional probability includes several other conditional probabilities and describes the mechanism used to hand-off the target track from one sensor to another. When a single sensor supports an engagement, there is no hand-off, and $P_{acquire}(i;\pi_D)$ is simply the probability of initial target detection. If two sensors coordinate on an engagement, there is one hand-off and $P_{acquire}(i;\pi_D)$ is given by the probability of initial target detection by the first sensor, times the conditional probability of cued acquisition by the second sensor, given the first sensor's initial detection. If there are n coordinating sensors, then there are n–1 target hand-offs that must be evaluated. The conditional probability of cued acquisition is modeled by equation (4) as:

$$P_{cued\ acq|acquire}(i;\pi_D) = P_{cued\ acq|receive\ cue}(i) \cdot P_{receive\ cue|cue\ sent}(i) \cdot P_{cue\ sent|track}(i) \cdot P_{track|acquire}(i) \quad (4)$$

where the defense plan identifier, $\pi_D$, has been suppressed in the arguments on the RHS. The definitions of all the terms used in the computation of the probability of kill are listed in FIG. 5.

Detailed models of the sensors, communication networks, interceptors, missiles, etc. are required to compute the probabilities listed in FIG. 5. The details of determining the models and their probabilities are known to those skilled in the art. Two important observations are that:

1. The defense assets need to coordinate to successfully intercept a target. Coordination implies that asset tasking cannot be constructed in isolation.

2. $P_{kill}(i, j, k; \pi_D)$ is a non-linear, discontinuous function that depends on many factors.

As mentioned, the optimization criterion is to construct a plan $\pi_D$ which is optimized, $\pi_D^*$, that maximizes the surviving defended asset value, $S_v$, i.e.:

$$\pi_D^* = \arg_{\pi_D} \max S_v(\pi_D) \quad (5)$$

The surviving asset value is defined as:

$$S_v(\pi_D) = \sum_{k=1}^{\substack{number\ of \\ defended\ assets}} \left\{ 1 - \prod_i^{\substack{number\ of \\ missiles}} [\xi_i \cdot p_{i,k} \cdot (1 - P_{kill}(i;\pi_D))] \right\} v(DA_k) \quad (6)$$

where:

$v(DA_k)$ is the value assigned to the $k^{th}$ defended asset such that $$\sum_{k=1}^{\substack{number\ of \\ defended\ assets}} v(DA_k) = 1; \quad (7)$$

where $\xi_i$ represents the probability that threat missile i is launched;

$p_{i,k}$ represents the probability the defended asset k is destroyed if missile i is not negated, and is a function of the missile lethality and the size of the defended asset.

The expected number of missiles launched in the attack is given by:

$$N_{missiles\ expected} = \sum_i \xi_i \qquad (8)$$

As pointed out in Pepyne et al., this type of an optimization problem entails searching over a solution space which may contain multiple local optima. In addition, the constraints posed on the asset placements are difficult to characterize analytically. These conditions make gradient-based optimization techniques difficult to apply and motivate the use of heuristic optimization methods. Some of the relevant optimization techniques are: simulated annealing as described in S. Kirkpatrick, C. D. Gelatt, Jr., and M. P. Vecchi, "*Optimization by simulated annealing*," Science, vol. 220, pp. 621-680, 1983; Genetic Algorithms (GAs) as described in Goldberg, D. A., "*Genetic Algorithms in Search, Optimization and Machine Learning.*" Addison-Wesley: Reading, Mass., 1989; and Tabu Search (TS), as described in D. Cvijovic and J. Klinowski, "*Tabu search: An approach to the multiple minima problem,*" Science, vol. 267, pp. 664-666, 1995, and in F. Glover, "Tabu search," in Modern Heuristic Techniques for Combinatorial Problems, C. R. Reeves, Ed. New York: Wiley, 1993. The optimization using GAs (Genetic Algorithms) is used according to an aspect of the invention, and provides a natural way to encode the position constraints imposed by the operational areas.

Figure 6:
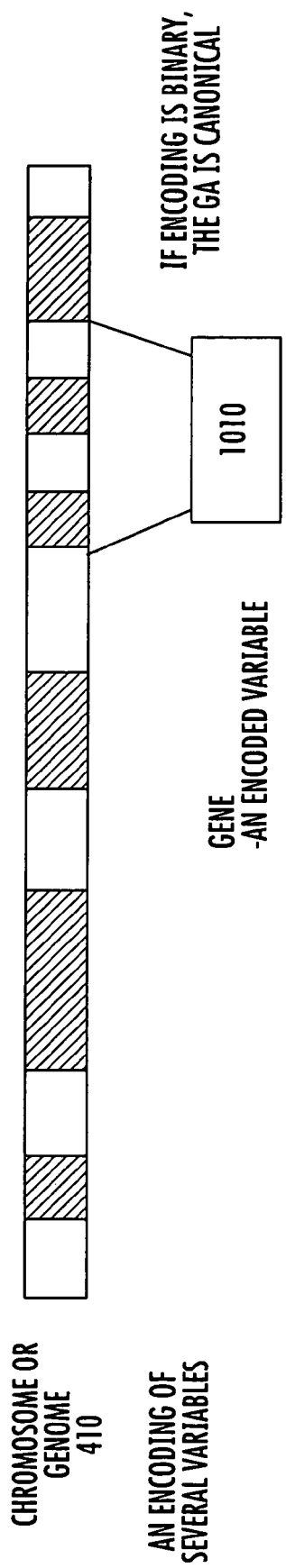
FIG. 6 illustrates binary encoding of variables as genes in a chromosome or genome.
Figure 7:
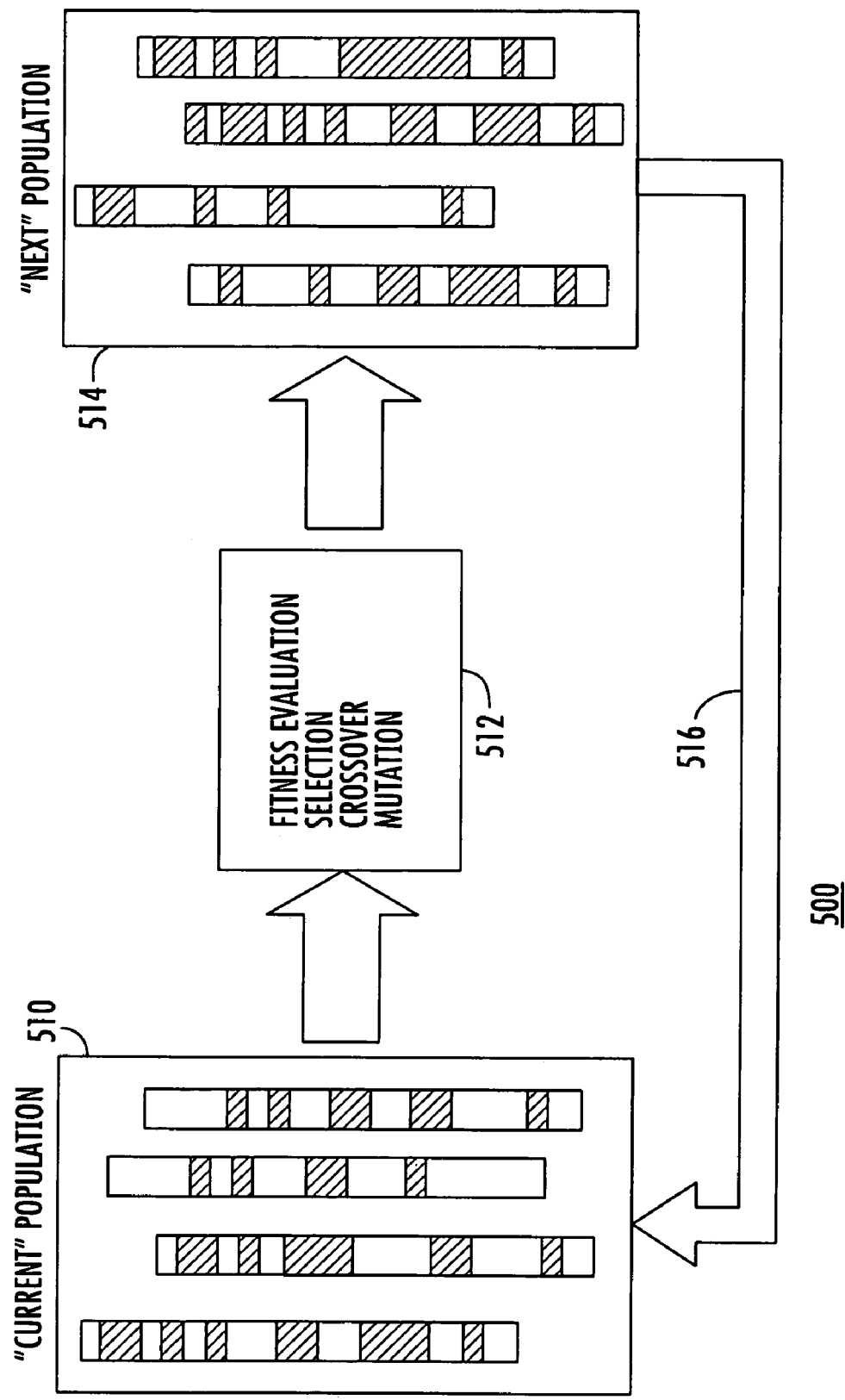
FIG. 7 is a simplified overview of a genetic algorithm for improving a quality of a population of genomes.

The genetic algorithm (GA) is inspired by evolution. A GA uses a population of solutions to search for the optimal solution. By using populations, the GA can quickly cover the entire search domain and converge to an optimal solution (local and global), as described in E. K. Burke, D. B. Varley, "*A genetic algorithms tutorial tool for numerical function optimization*", Proceedings of the 2nd conference on integrating technology into computer science education, Uppsala, Sweden, Pages: 27-30, 1997. Each population member encodes a potential solution to a specific problem as a chromosome (or genome) which represents an encoding of many variables. When the chromosome 410 is encoded as a binary string (that is, a string of ones and zeroes), as illustrated in FIG. 6, the GA is said to be canonical. Other encoding schemes have been proposed in the literature, F. Herrera, M. Lozano, J L. Verdegay, "Tackling Real-Coded Genetic Algorithms: Operators and Tools for Behavioural Analysis", Artificial Intelligence Review, vol. 12, num. 4, p.p. 265-319, 1998, and Eremeev, A. V., "*A genetic algorithm with a non-binary representation for the set covering problem*", In: Proc. of Operations Research (OR '98). Springer-Verlag, (1999), p.p. 175-181. The fitness of each potential solution is evaluated by the Genetic Algorithm, illustrated in simplified form in FIG. 7, to determine how well it solves the underlying optimization problem. In FIG. 7, the current population represented by the genomes of block 510 is applied through a fitness evaluation block 512 to assign a fitness value to each population member. Using the fitness value of block 512 as a guide, a series of recombination operators are applied to the population to evolve it into a "better" population (containing solutions with higher fitness values) 514, while preserving genetic diversity. When applied recursively over a series of generations, as represented by the feedback path 516, these operations guide the population to converge to a near-optimal solution. Three major recombination operations are used: selection, crossover and mutation.

The selection operation 512 of FIG. 7 is intended to emulate Darwin's concept of survival of the fittest: the "best" population members survive to create new offspring. Thus, the selected chromosomes are termed the parents and are used in block 512 to create the next population of chromosomes. There are many methods in selecting the "best" chromosomes in block 512. Examples are roulette wheel selection, tournament selection, and rank selection, as described in S. M. Sait, H. Youssef, "*Iterative Computer Algorithms with Applications in Engineering*", IEEE Computer Society, 1999, pp. 139-141. In general these methods use the population fitness values to select the "best" chromosomes. The mechanism used to generate offspring in block 512 is known as crossover. It operates on two parents and results in one or more offspring, each inheriting some of the parent characteristics. The mutation operation in block 512 introduces random changes in the offspring resulting from crossover. When the chromosomes are encoded as binary strings, mutation randomly flips selected chromosome bits. Mutation is applied probabilistically to only a few population members and has the effect of perturbing a population and introducing some new characteristics not present in the current population. The GA proceeds until certain termination criteria are satisfied. A good source for additional details on GAs is Eremeev, supra.

Figure 8:
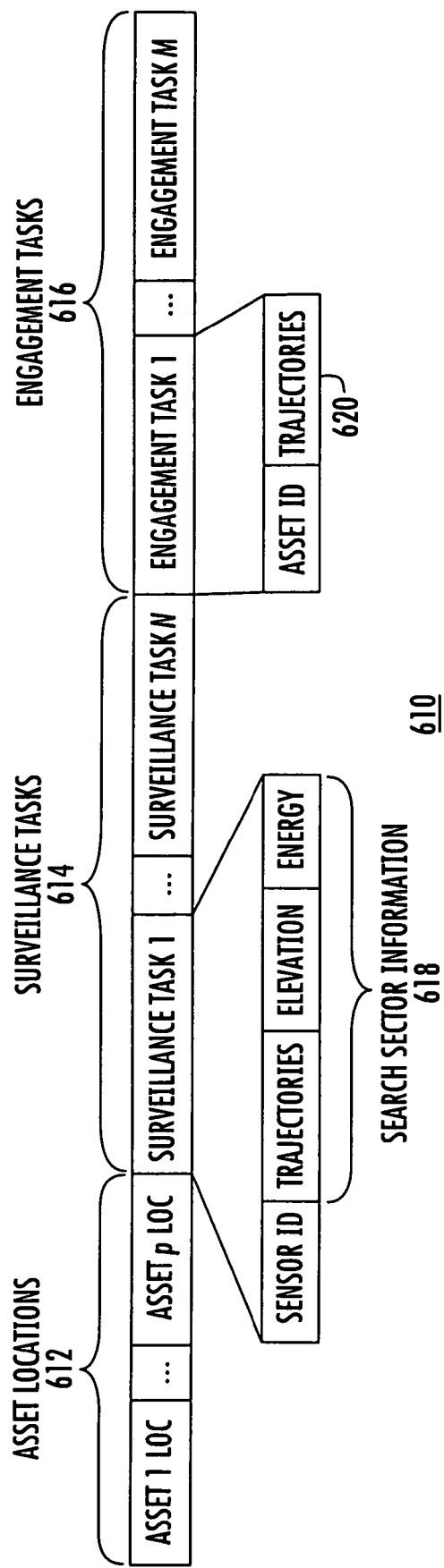
FIG. 8 is a simplified representation of a possible encoding of defense policies in a genome.

Each potential solution encodes a complete defense policy $\pi_D$, which specifies the locations and task allocation for all BMD assets. The variables included in the encoding as well as their relative positions in a genome are shown in FIG. 8. In FIG. 8, the illustrated portion of a genome is designated generally as 610. Defense asset location information is encoded in the first (left end) part 612 of the genome. The locations of the defense assets are concatenated in first portion 612, from asset number 1 to asset number p. In the event that a sensor and one or more interceptors must be (are required to be) co-located, then only one location gene is included for those assets. Those skilled in the art know how to encode such multiple locations. Surveillance and engagement tasks are encoded in later portions 614, 616 of the genome. Each surveillance task in portion 614 of the genome contains information about the surveillance volume and the assigned sensor. More particularly, surveillance task 1 of portion 614 of FIG. 8 includes sensor identification (ID) information, as well as information about the search sector characteristics as illustrated in portion 618 of the genome. This search sector or surveillance volume information includes the ballistic trajectories to be surveyed, the elevation and the energy to be expended by the sensor. The trajectories are encoded as a binary string of length T (the number of trajectories). A logic high or logic "1" in the $n^{th}$ position indicates that the $n^{th}$ trajectory is covered by this task. As such, a single surveillance volume may be assigned to survey one or more trajectories. This encoding acts to cluster closely located trajectories (at a given elevation) and assign them to a single surveillance volume. The surveillance azimuth and range extents are determined by deterministic, sensor specific algorithms from the elevation and assigned trajectory set. Using the GA to determine the surveillance volumes helps maximize sensor utilization.

Each engagement task in portion 616 of genome 610 of FIG. 8 contains information (in portion 620) about the trajectories assigned to this task (similar to the surveillance task encoding) and the asset assigned to perform the task. Unlike the surveillance task, an engagement task may be assigned to either a sensor or an interceptor. If a sensor is selected to perform an interceptor support task, it is responsible for acquiring the threat(s) and supporting the interceptors launched to negate the threat(s). Conversely, if an interceptor is selected, it is responsible for launching and engaging the threats on the assigned trajectories. By associating the engagement task type (e.g. interceptor support, launch) with the assigned asset type, we avoid encoding improper tasking assignments (e.g. a sensor asked to launch an interceptor).

Unlike the surveillance tasks associated with portion 614 of FIG. 8, the encoding for the interceptor support tasks of portion 616 does not include an energy allocation component. This is because the sensors are assumed to be controlled by real-time software which automatically manages the resources used to track and engage the missile. Because this decision logic is embedded into the systems and is automatically applied, there is no need for it to be pre-planned. The GA uses a model of this allocation logic to determine the optimal asset placement and coordinated taskings.

It should be noted that the number of surveillance and engagement tasks encoded by the genome of FIG. 8 is a control variable. If too few tasks are encoded, too many trajectories must be assigned to each surveillance/engagement task and it is may be more difficult to find a satisfactory plan. If too many tasks are encoded, the plan computation time is unnecessarily long. When an intermediate number of tasks are included in the encoding, the GA can design robust defense plans by assigning multiple assets to perform the same task, while not suffering unnecessary computational time. Thus, using this encoding, there is a tradeoff between defense plan robustness and GA computational performance. Good performance has been found to occur by setting the number of surveillance/engagement tasks equal to T, the number of trajectories, but other settings may also be used.

The potential solutions encoded by the genome presented in FIG. 8 may not all correspond to valid defense policies. A potential solution is termed infeasible when the corresponding defense policy, due to a constraint violation, cannot be executed. There are three constraints that, when violated, lead to infeasible solutions. The first constraint is that all assets must be placed within the predefined operational areas. The second constraint is that only one sensor can be placed at any location. Unless the operating areas are very small, this constraint is rarely violated. The final constraint limits the amount of energy resources that each sensor can use. This constraint becomes a factor in problems where few sensors are asked to defend against a large number of targets. Constraints can cause performance problems in GAs Eremeev, supra. Three common strategies are discussed in the literature for dealing with constraints. The first is to construct an encoding that minimizes the occurrence of infeasible solutions. The second is to map infeasible solutions into feasible ones. The third is to penalize infeasible solutions during the fitness evaluation phase so they are not selected to participate in the plan generation of the next population. The first strategy in encoding the asset locations works well for our application. Specifically, a matrix is defined for each asset type operating area. Each row of this matrix contains an (x, y) location within the operating area. The numbers of rows is an integer power of 2. When the operating area contains fewer locations than the number of rows, locations are repeated in a cyclic manner. Using this representation, an asset location is simply defined by a row index and only valid asset locations are represented in the genome. For other infeasible solutions a strategy is used of penalizing infeasible solutions during the fitness evaluation phase of the process.

Initial population selection for starting the "current" population 510 of FIG. 7 can affect the GA's ability to converge to a near-optimal solution in the case of large constraint optimization problems. It is desirable to specify an initial population that contains characteristics that define "good" solutions. In the ballistic missile defense application, there are two characteristics of a "good" solution: 1) it must not violate any operational constraints and 2) it needs to successfully negate one or more of the ballistic trajectories. If an initial population contains these characteristics, the GA will evolve its members and converge to a near optimal defense policy. In addition, the initial population must be diverse enough so it does not get trapped in a locally optimal, but globally poor, solution. Diversity in the initial population helps the algorithm explore the whole search space. Important elements of the algorithm used to initialize the population are as follows:

Step 1: For each asset type, locations are selected within the operating area, such that an asset can perform at least one surveillance or engagement task and estimate the energy required per task. Such locations are designated as being valid.

Step 2: A randomly selected asset is randomly placed a valid location and assigned as many tasks as it is estimated it can perform without violating its resource constraint.

Step 3: A greedy policy (a policy that takes the action that appears best in the short run, and ignores long-term effects) is used to determine a valid location from which a randomly selected unassigned asset is expected to perform the maximum number of tasks that other assets have not been already assigned.

Step 4: Repeat Step 3 until all available assets are placed on valid locations and assigned tasks.

Such an initial population algorithm is tailored to support the design criteria of maximizing the surviving defended asset value.

The fitness evaluation function 512 of FIG. 7 must be prepared or constructed before the genetic algorithm 500 can be run. The planning objective is to construct the defense policy, $\pi_D{}^*$, which maximizes some fitness function, $f(\bullet)$, i.e.:

$$\pi_D{}^* = \arg_{\pi_D} \max S_v(\pi_D) \tag{5}$$

The optimization objective is to maximize the expected surviving value of the defended areas, i.e.:

$$f(\pi_D) = S_v(\pi_D). \tag{9}$$

In addition to maximizing the expected surviving asset value, other conflicting optimization criteria may need to be considered; e.g. minimizing interceptor wastage, expected collateral damage, or resource usage. These constraints must be captured by the fitness function and the population initialization algorithm, and are believed to be known to those skilled in the art. If an operational constraint is violated, it causes the plan corresponding to the solution to be non-executable. These infeasible solutions are assigned a zero fitness value.

The recombination operators 514 of FIG. 7 are applied to a population to evolve it into a "better" population while preserving critical information. The selection operator 512 identifies the parents: the members of the current population mated together to generate the next generation. In one mode of the method of the invention, the popular roulette wheel selection process is used with elitism, as described by Eremeev, supra. Parents are paired off and two point crossover is performed to produce the children. Finally, any bit of each child is independently flipped with a very low mutation rate, such as $(10^{-4})$, for example.

Figure 9:
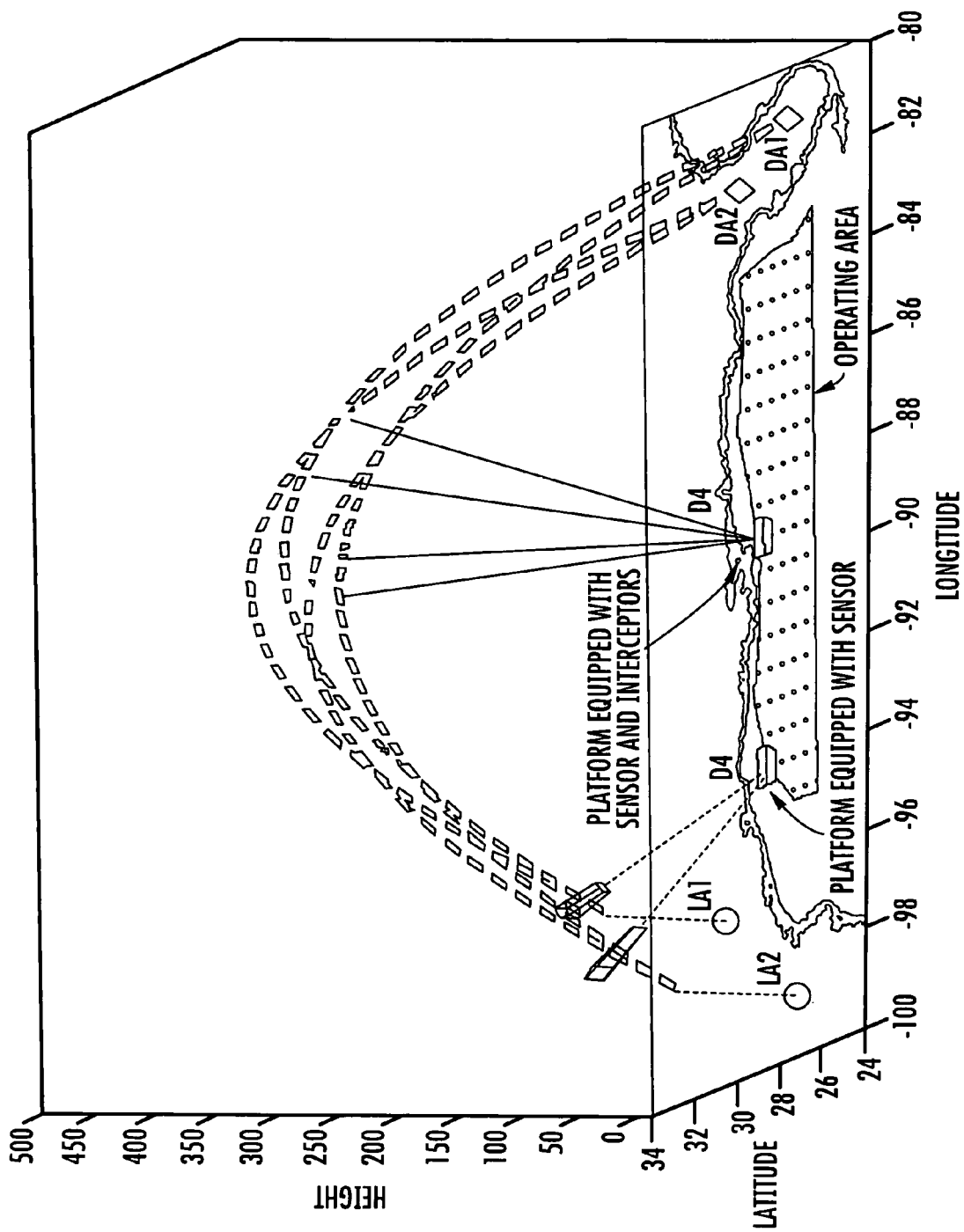
FIG. 9 shows the BM plan resulting from a simple problem involving two launch areas and two defended areas.

The coordinated multi-asset planning approach outlined above was implemented and applied to multiple BMD problems. FIG. 9 illustrates the results of this approach when applied to a simple BMD problem containing two launch areas (LAs) and two defended areas (DAs). Each of the DAs was assigned an asset value of 0.5. The LAs were assigned equal probabilities of launching a missile, and each launched missile was assigned the same lethality measure. The defense objective was to protect the DAs using two sea based platforms. One sea-based platform was equipped with only a sensor, while the second was equipped with a sensor and multiple interceptors. Thus, this problem represents a special case in which a sensor is co-located with one or more interceptors. Using a population size of 80, a crossover probability of 0.9 and a mutation rate of $10^{-4}$, the GA was able to quickly construct a feasible defense plan. In particular, the GA assigned all surveillance tasks to the platform equipped with only a sensor, and all engagement tasks were assigned to the other platform.

Figure 10:
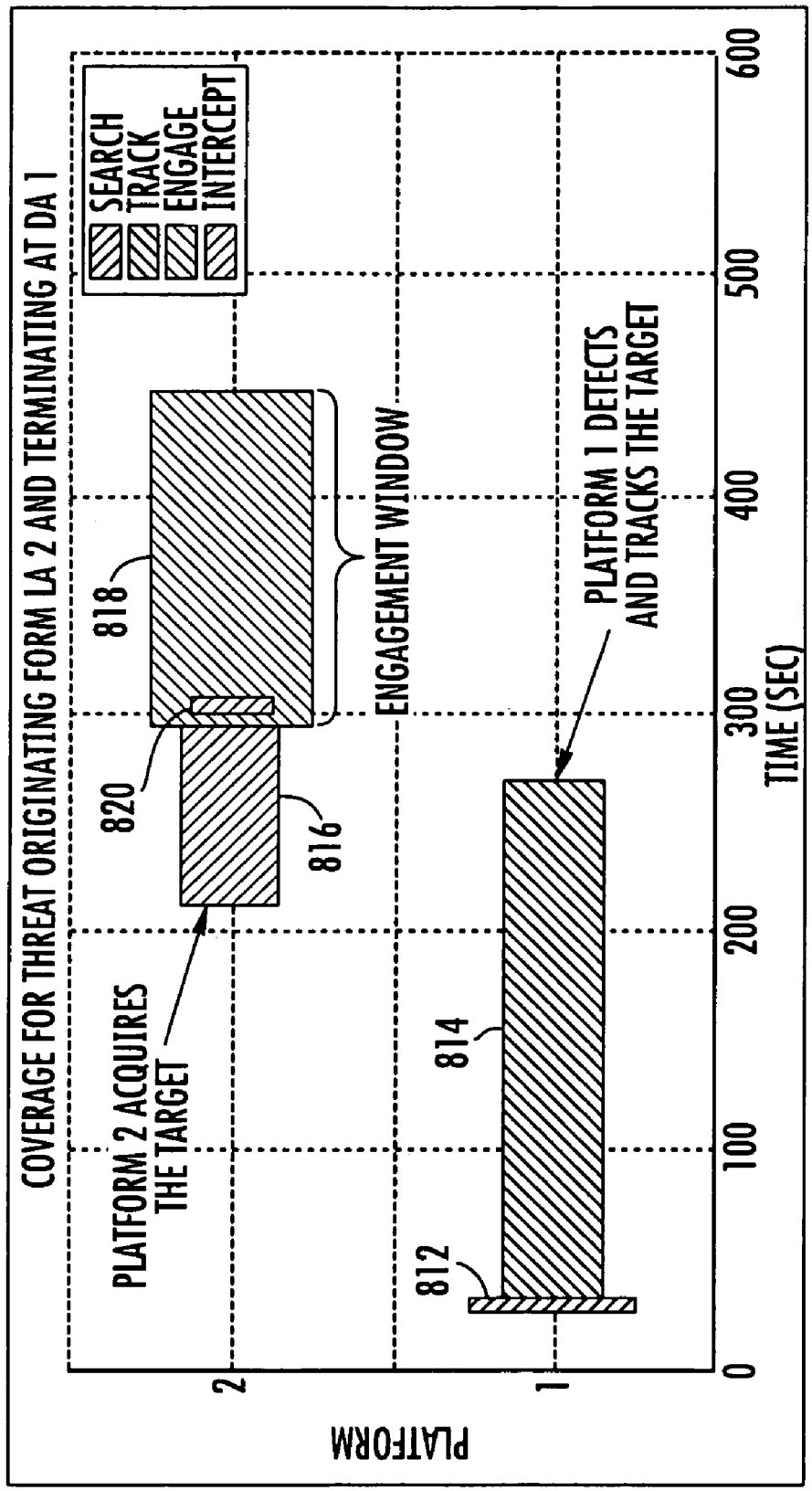
FIG. 10 represents a timing diagram illustrating the engagement contemplated in FIG. 9.

The plan produced by the GA and illustrated in FIG. 9 requires both platforms to coordinate to negate any of the incoming threats. FIG. 10 illustrates this coordination as a function of time for a particular threat. At the lower portion of FIG. 10, the search 812 is performed at about 25 seconds after launch by platform 1, which has only sensors. The search cannot be performed prior to this time due to the curvature of the Earth. Platform 1 detects and initiates a track on the launched missile, as suggested by portion 814 in the interval 25 to 270 seconds. The track is handed-over to Platform 2 at about 220 seconds, which in turn initiates a new track (acquires the threat), as suggested by track portion 816. Platform 2 provides aim and guidance (intercept) data for the interceptor. This information can be provided by the sensor located on Platform 2 over a period of time, illustrated as 290 to 440 seconds, which defines the engagement window 818 for that threat. The interceptor can launch to engage the threat anywhere within this engagement window. The particular intercept is illustrated as 816 at about 305 seconds.

Figure 11:
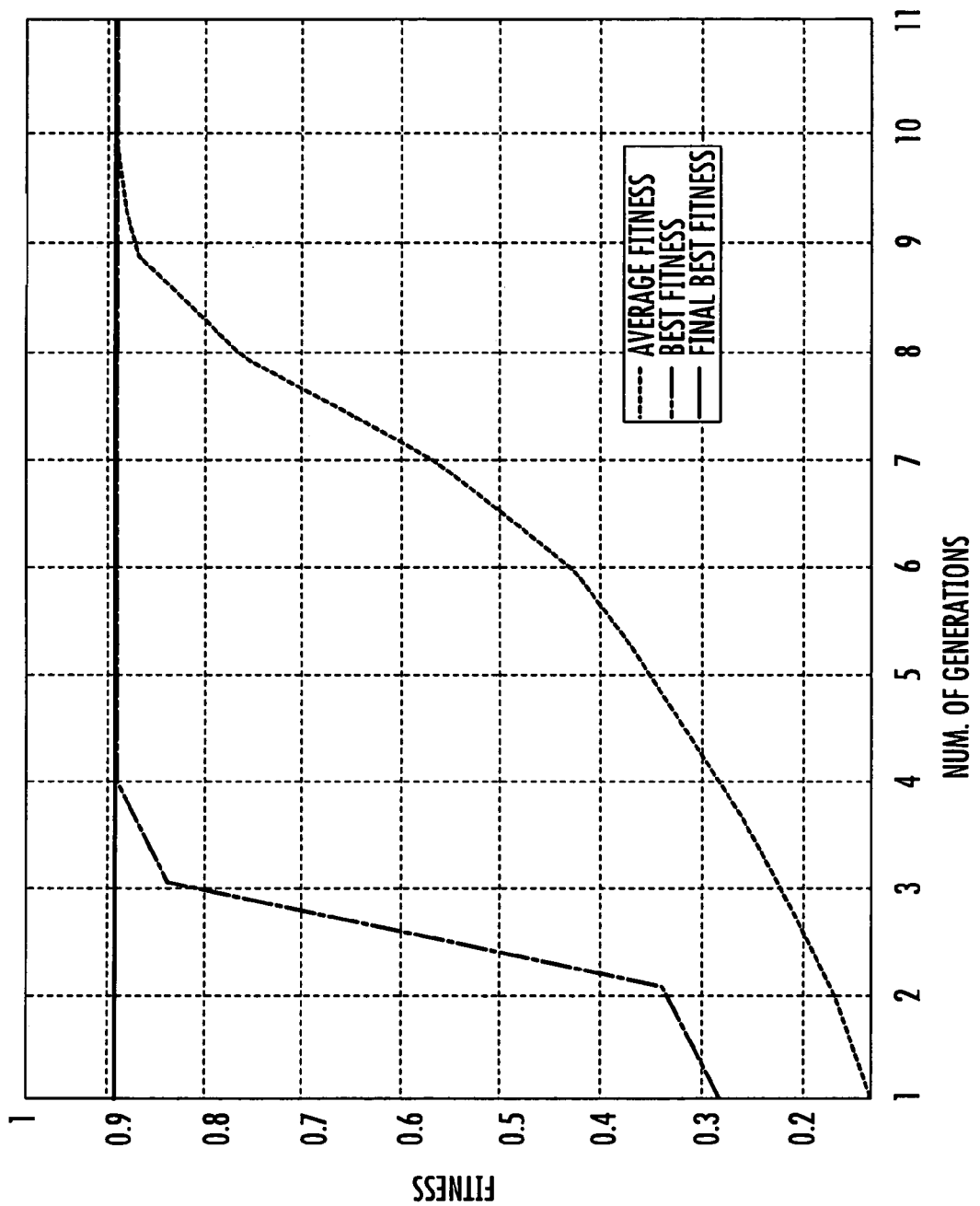
FIG. 11 represents number of iterations through the genetic algorithm plotted against fitness of the resulting solutions.

FIG. 11 shows the typical performance of the GA as a function of time in the described simulation. From this figure it can be seen that the GA finds the best overall solution after just a limited number of generations or iterations (in this example 5), while the average population fitness converges quickly (in approximately 11 generations for this example). This, despite the fact the initial population begins with a very small average fitness value (<0.1). This behavior can be explained by the quality of the initial population. The initial population members, even though in average do not achieve high fitness values, contain the characteristics necessary to construct a good plan. As a result, the GA can quickly construct feasible plans that attain high fitness values.

Thus, ballistic missile defense (BMD) according to an aspect of the invention uses an array of cooperating sensors and shooters to coordinate planning defense against a ballistic missile attack. The coordinated planning approach determines the placement and tasking of available defense assets so that the resulting plan provides optimal satisfaction of the defense objective. The defense problem is cast as a multi-variable optimization problem and is solved using a GA. The problem formulation removes several simplifying assumptions that were imposed in previous, related work. Specifically, the method according to an aspect of the invention allows each sensor to use multiple surveillance volumes to make better use of limited surveillance resources. The GA determines the location, size and resources allocated to each surveillance task. Additionally, the method according to an aspect of the invention allows the available assets to coordinate to better negate the missile attack. Coordinated defense may enable satisfactory protection when non-coordinated assets are unable to provide adequate defense. Additionally, even if non-coordinated defense can negate the threat, solutions that use coordinating assets may provide a more robust defense. As generally described, the missile defense problem is formulated as a multi-variable, constrained, static allocation problem. The optimization criterion is to maximize the surviving defended asset value. Position constraints are imposed by the operating areas defined for each asset, and resource constraints are imposed on each asset. A sample problem is described and a GA, with the solution encoding and initial population procedures according to aspects of the invention, efficiently navigate the large, complex, and constrained solution space to find an effective defense allocation.

Figure 12:
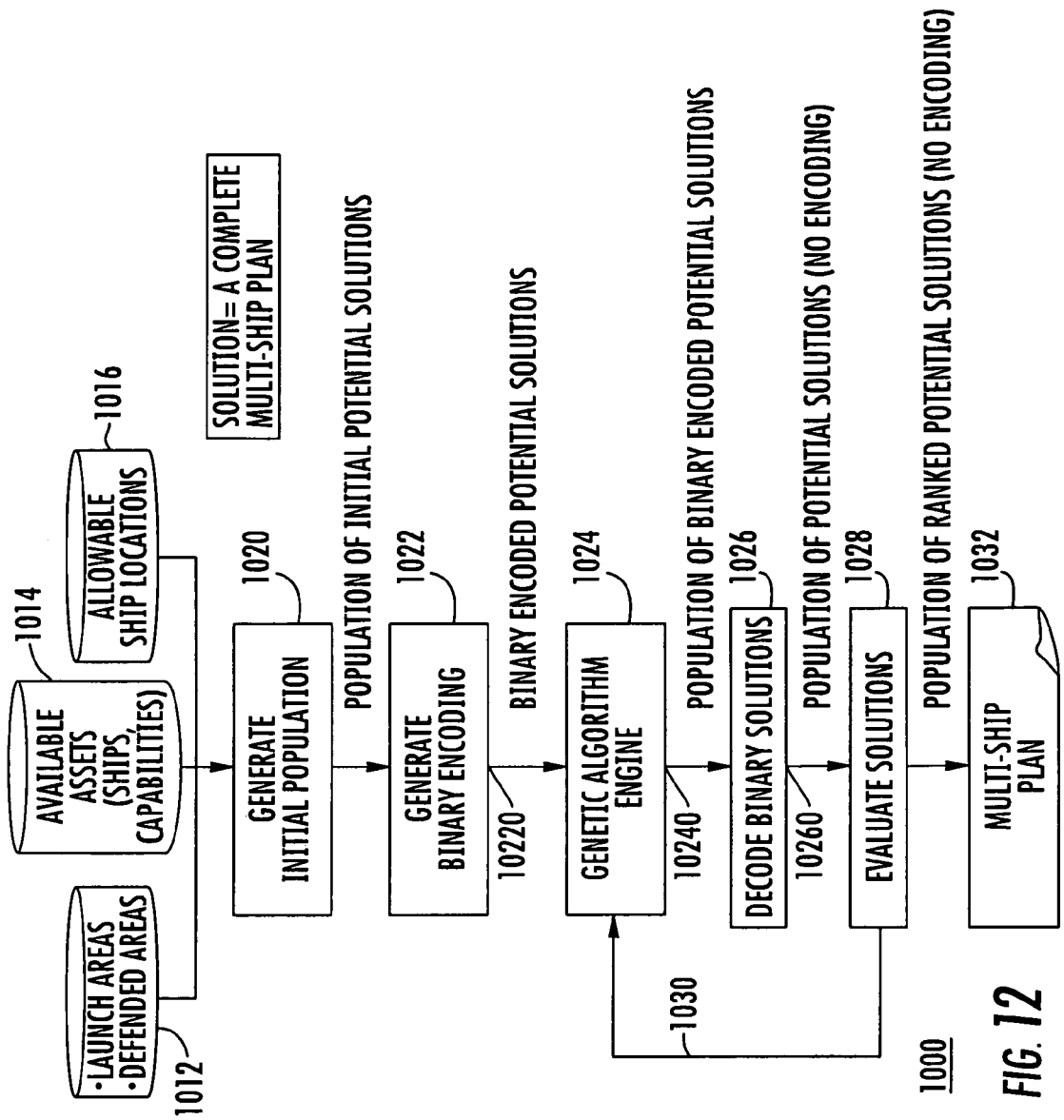
FIG. 12 is a simplified flow chart illustrating a method according to an aspect of the invention for generating plans for ballistic missile defense.

FIG. 12 illustrates the overall method of generation 1000 of a multi-asset or multi-platform plan according to aspects of the invention. In FIG. 12, generation begins with a definition of launch areas and defended areas, represented by a memory 1012, definition of available assets 1014, and allowable ship (or other asset) locations 1016. The definitions include assets having both sensors and engagement capabilities, which are to be coordinated. The definitions may include assets having only sensors or engagement capabilities. The initial potential solutions are generated, as suggested by block 1020, and the resulting potential solutions are binary-encoded in block 1022. The binary encoding, according to an aspect of the invention, provides single locations for at least some of the plural assets, thus indicating that the ship or platform has multiple capabilities. The binary-encoded potential solutions are passed to the genetic algorithm engine, illustrated as a block 1024. Block 1024 performs the combination and mutation as generally described in conjunction with FIG. 7, to produce a new population of binary coded potential solutions. Block 1024 retains a copy of the new population of potential solutions, and passes another copy on for decoding in block 1026. The resulting decoded potential solutions are evaluated by a block 1028. The best solutions are memorized in block 1028, and all are returned by a path 1030 to the genetic algorithm engine represented by block 1024. When the feedback loop returns the fitness values to the GA engine, the GA engine uses them in concert with the binary solution it has retained. After a predetermined number of iterations through the genetic algorithm, the best solution from among the decoded potential solutions is deemed (block 1032) to be the multi-ship or multi-platform plan.

A method according to an aspect of the invention is for planning ballistic missile defensive actions. The method (1000) comprises the steps of defining (1012) potential ballistic missile launch areas (24a, 24b) and areas (18) to be defended, and defining (1014) available assets (such as 210a, 210b, 220a, 220b) and allowable locations (1016) for the available assets (such as 210a, 210b, 220a, 220b), where at least one of the assets (210) has sensing capabilities independent of those of other assets (220), and at least one of the assets (220) has ballistic missile intercept capabilities independent of those of other assets (210). An initial population of potential defensive solutions is defined (1020) from the launch areas, defended areas, assets and allowable locations. The initial population of potential defensive solutions is binary encoded (1022). The binary encoded initial population of potential defensive solutions (at output 1022o) is applied to a genetic algorithm engine (1024), to thereby generate (at output 1024o) a population of binary encoded genetically modified potential defensive solutions. The population of binary encoded genetically modified potential defensive solutions is decoded (1026) to thereby produce (at output 1026o) non-binary-coded genetically modified potential defensive solutions. At least some of the non-binary-coded genetically modified potential defensive solutions are re-applied (1028, 1030) to the genetic algorithm engine (1024) to thereby generate (at output 1024o) a further population of binary encoded genetically modified potential defensive solutions. The further population of binary encoded genetically modified potential defensive solutions is decoded (1026) to produce (at output 1026o) a further population of non-binary-coded genetically modified potential defensive solutions. The non-binary-coded genetically modified potential defensive solutions are evaluated (1028), and one of the non-binary-coded genetically modified potential defensive solutions is deemed to be the desired plan (1032). The re-application may be repeated, and in particular may be repeated a predetermined number of times. In a particular mode of this method, the step of evaluating (1028) includes the step of ranking non-binary-coded genetically modified potential defensive solutions, wherein the desired plan is among the highest ranked of the non-binary-coded genetically modified potential defensive solutions.

A method according to another aspect of the invention is for computer-aided generation of a plan for coordinating ballistic missile defense assets against ballistic missile threats. The method comprises the steps of acquiring or generating, as by user input, digital information about allowable asset locations (1016) and desired objectives (1012). The method also includes the step of acquiring or generating digital information about allowable asset capabilities. In particular, at least one of the defense assets includes sensor capabilities independent of those of other assets, and at least one of the assets includes ballistic missile engagement capabilities independent of those of other assets. The acquired or generated digital information is binary encoded (1022), to thereby generate (at output 1022o) a binary encoded representation of plural potential plans. The step of binary encoding comprises the step of generating a binary string representing a plan. The plural potential plans are applied to a genetic optimization process (1024), generally known in the art, for generating a series (or plurality) of processed (or new) potential plans, still represented in binary encoded form. The genetic optimization process may retain at least some of the processed potential plans, and also make them available for decoding (1026). At least some of the decoded processed potential plans are evaluated (1028), possibly by ranking as to suitability. Some of the ranked potential plans may be retained in memory. The evaluations are made available for "feed back" (1030) to the genetic optimization process (1024) for further genetic optimization. The genetic optimization (1024), decoding (1026), evaluation (1028) and feedback (1030) process repeats or iterates until some criterion is reached. In one mode of the method, the criterion is a predetermined number of iterations (ten in the example). Following the completion of iteration, the latest decoded solutions are ranked (1028), possibly together with the previously memorized solutions, to thereby generate ranked potential plans. One of the highest-ranked potential plans is selected as the desired plan. Most often, the desired plan is deemed to be the highest-ranked plan. In a particular mode of this method, the step of generating a binary string (610) representing a plan comprises the steps of assigning a first block of bits (612) to represent the locations of all participating assets, a second block of bits (614) to represent all surveillance tasks, and a third block of bits (616) to represent all engagement tasks. In this particular mode, the step of assigning a second block of bits (614) to represent all surveillance tasks includes the steps of assigning a first sub-block of bits (Sensor ID) of the second block of bits (614) to represent the identity of assigned sensor, a second sub-block (Trajectories) of the second block of bits (614) to represent the trajectory which is to be sensed, a third sub-block of bits (Elevation) of the second block of bits (614) to represent the elevation at which sensing is to be performed, and a fourth sub-block of bits (Energy) of the second block of bits (614) to represent the energy allocated to the sensing task. In this particular mode, the step of assigning a third block of bits (616) to represent all engagement tasks includes the steps of assigning a first sub-block of bits (Asset ID) of the third block of bits (616) to represent the identity of assigned asset, and assigning a second sub-block (Trajectories) of the third block of bits (616) to represent the trajectory which is to be engaged.

What is claimed is:

1. A method for computer-aided generation of a plan for coordinating ballistic missile defense assets against ballistic missile threats, said method comprising the steps of:

defining potential ballistic missile launch areas and areas to be defended;

defining available defense assets and allowable locations for said available defense assets, at least some of said defense assets having at least (1) sensing capabilities independent of those of others of said defense assets and (2) engagement capabilities independent of those of other of said defense assets;

defining from said launch areas, defended areas, defense assets and allowable locations an initial population of potential defensive solutions;

binary encoding said initial population of potential defensive solutions using a first processor;

applying the binary encoded initial population of potential defensive solutions to a genetic algorithm engine, to thereby generate a population of binary encoded genetically modified potential defensive solutions;

decoding said binary encoded genetically modified potential defensive solutions to thereby produce non-binary-coded genetically modified potential defensive solutions;

re-applying at least some of said non-binary-coded genetically modified potential defensive solutions to said genetic algorithm engine to thereby generate a further population of binary encoded genetically modified potential defensive solutions;

decoding said further population of binary encoded genetically modified potential defensive solutions to produce a further population of unencoded potential solutions;

evaluating said unencoded potential solutions and deeming one of said unencoded potential solutions to represent the desired plan for coordinating the defense assets against the ballistic missile threats.

2. A method according to claim 1, wherein said step of evaluating includes the step of ranking unencoded potential solutions, wherein said desired plan is among the highest ranked unencoded potential solutions.

3. A method for computer-aided generation of a plan for coordinating ballistic missile defense assets against ballistic missile threats, said method comprising the steps of:

acquiring or generating digital information about allowable asset locations, and desired objectives;

acquiring or generating digital information about allowable asset capabilities and limitations, where the sensor capabilities of at least one of the assets is independent of the sensor capabilities of another asset, and the intercept capabilities of at least one of the assets is independent of those of other assets;

applying said input digital information to a first processor for binary encoding, to thereby generate a binary encoded representation of plural potential plans;

applying said plural potential plans to a genetic optimization process for generating a plurality of processed potential plans; and ranking the quality of said new potential plans to thereby generate ranked new potential plans.

4. A method according to claim 3, further comprising applying said ranked new potential plans to said genetic optimization process to thereby generate further new potential plans; and ranking the quality of said new potential plans to thereby generate ranked new potential plans.

5. A method according to claim 3, further comprising the steps of:

applying said ranked new potential plans to said genetic optimization process to thereby generate further new potential plans; and ranking the quality of said new potential plans to thereby generate ranked new potential plans;

repeating said steps of applying said ranked new potential plans and generating ranked new potential plans; and ceasing said repeating steps after a predetermined number of iterations.

6. A method according to claim 5, further comprising the step of:

evaluating the quality of each of said new potential plans after each said iteration; and storing information identifying at least the highest quality potential plan at each iteration.

7. A method according to claim 3, wherein said step of binary encoding comprises the step of:

generating a binary string representing a plan.

8. A method according to claim 7, wherein said step of generating a binary string representing a plan comprises the steps of:

assigning a first block of bits to represent the locations of all participating assets, a second block of bits to represent all surveillance tasks, a third block of assets to represent all engagement tasks.

9. A method according to claim 8, wherein said step of assigning a second block of bits to represent all surveillance tasks includes the steps of;

assigning a first sub-block of bits of said second block of bits to represent the identity of assigned sensor, a second sub-block of said second block of bits to represent the trajectory which is to be sensed, a third sub-block of bits of said second block of bits to represent the elevation at which sensing is to be performed, and a fourth sub-block of bits of said second block of bits to represent the energy allocated to the sensing task.

10. A method according to claim 8, wherein said step of assigning a third block of assets to represent all engagement tasks includes the steps of;

assigning a first sub-block of bits of said third block of bits to represent the identity of assigned asset; and assigning a second sub-block of said third block of bits to represent the trajectory which is to be engaged.

* * * * *